(No Model.) 5 Sheets—Sheet 1.

H. FRANZ.
GLASS MOLD.

No. 342,743. Patented May 25, 1886.

Witnesses.
Harry L. Gill
W. B. Corwin

Inventor.
Henry Franz
by his attorneys
Bakewell & Kerr (No Model.) H. FRANZ. 5 Sheets—Sheet 2.
GLASS MOLD.

No. 342,743. Patented May 25, 1886.

Witnesses. Inventor.
Harry L. Gill Henry Franz
W. B. Corwin by his attorneys
Bakewell & Kerr (No Model.) 5 Sheets—Sheet 3.
H. FRANZ.
GLASS MOLD.

No. 342,743. Patented May 25, 1886.

Witnesses. Inventor.
Harry L. Gill, Henry Franz,
by his attorneys
Bakewell & Kerr (No Model.) 5 Sheets—Sheet 4.

H. FRANZ.
GLASS MOLD.

No. 342,743. Patented May 25, 1886.

Witnesses

Inventor.
Henry Franz
by his attorneys
Bakewell & Kerr (No Model.) 5 Sheets—Sheet 5.

H. FRANZ.
GLASS MOLD.

No. 342,743. Patented May 25, 1886.

Witnesses.
Harry L. Gill
N. B. Corwin

Inventor
Henry Franz
by his attorneys
Bakewell & Kerr

UNITED STATES PATENT OFFICE.

HENRY FRANZ, OF PITTSBURG, PENNSYLVANIA, ASSIGNOR TO CAMPBELL, JONES & CO., OF SAME PLACE.

GLASS-MOLD.

SPECIFICATION forming part of Letters Patent No. 342,743, dated May 25, 1886.

Application filed February 11, 1886. Serial No. 191,538. (No model.)

*To all whom it may concern:*

Be it known that I, HENRY FRANZ, of Pittsburg, in the county of Allegheny and State of Pennsylvania, have invented a new and useful Improvement in Glass-Molds; and I do hereby declare the following to be a full, clear, and exact description thereof, reference being had to the accompanying drawings, forming part of this specification, in which—

Figure 1:
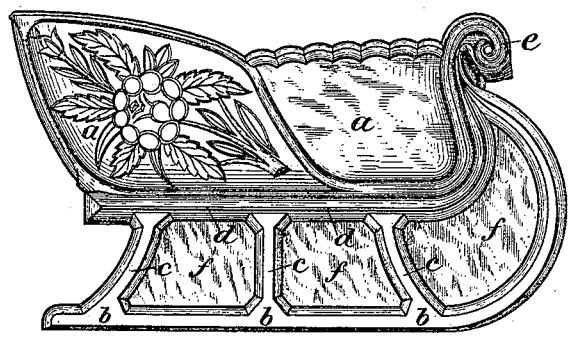
Figure 2:
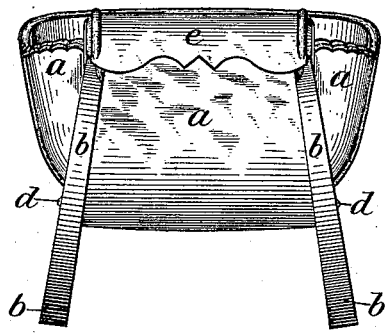
Figure 3:
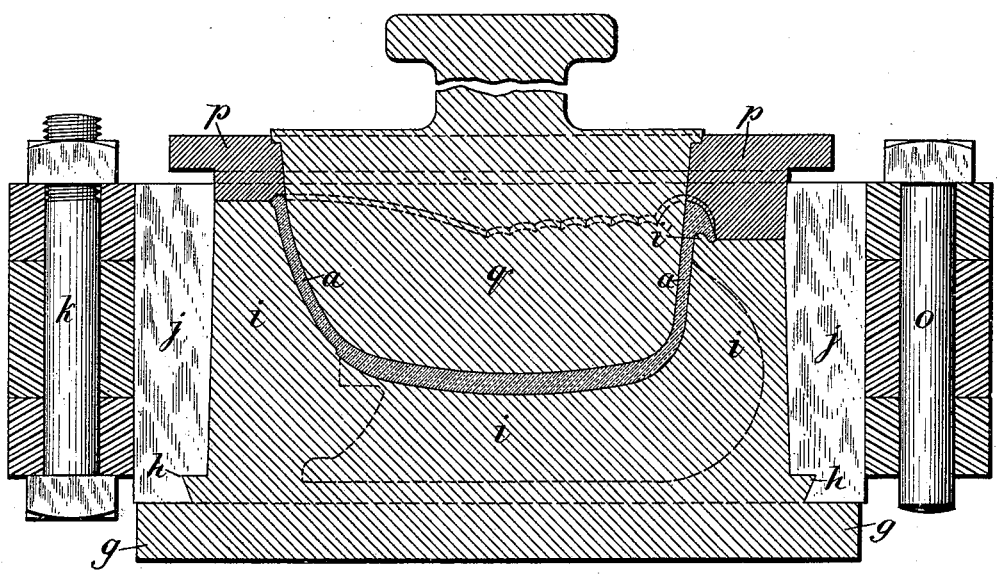
Figure 4:
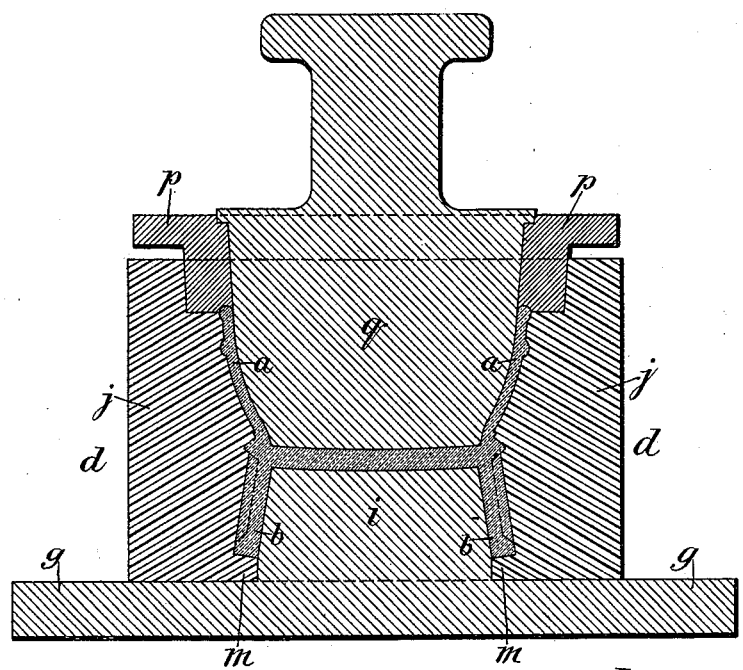
Figure 5:
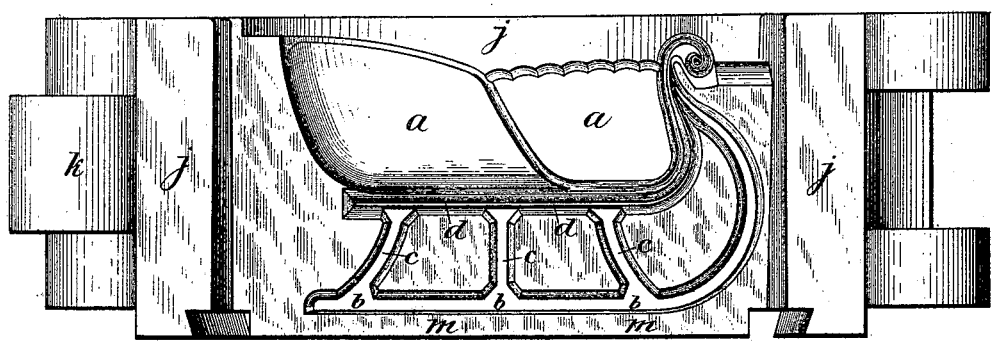
Figure 6:
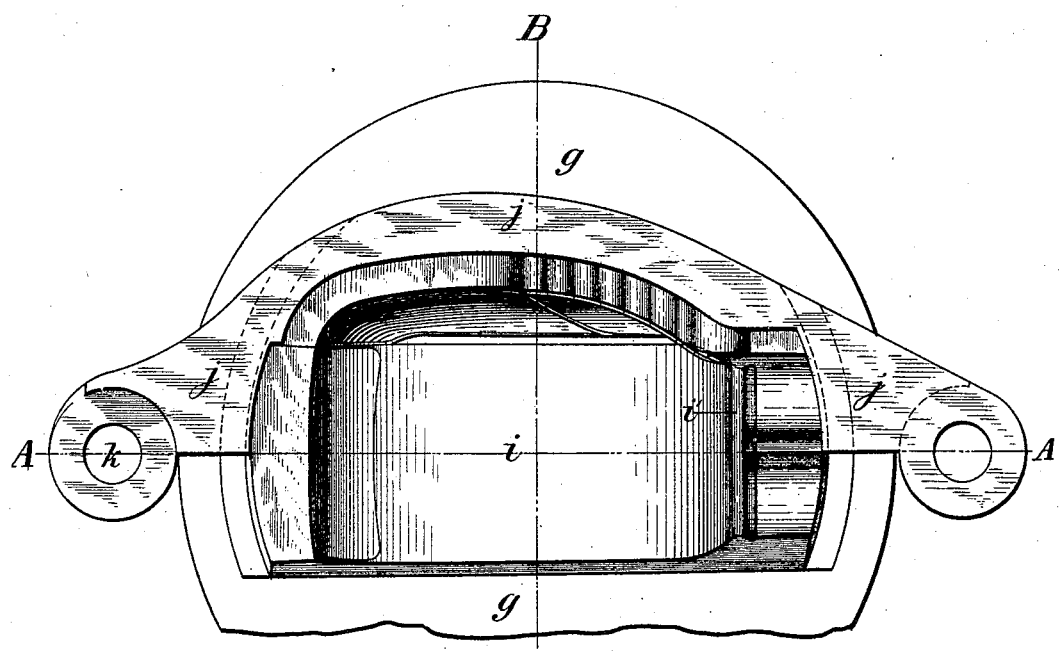
Figure 7:
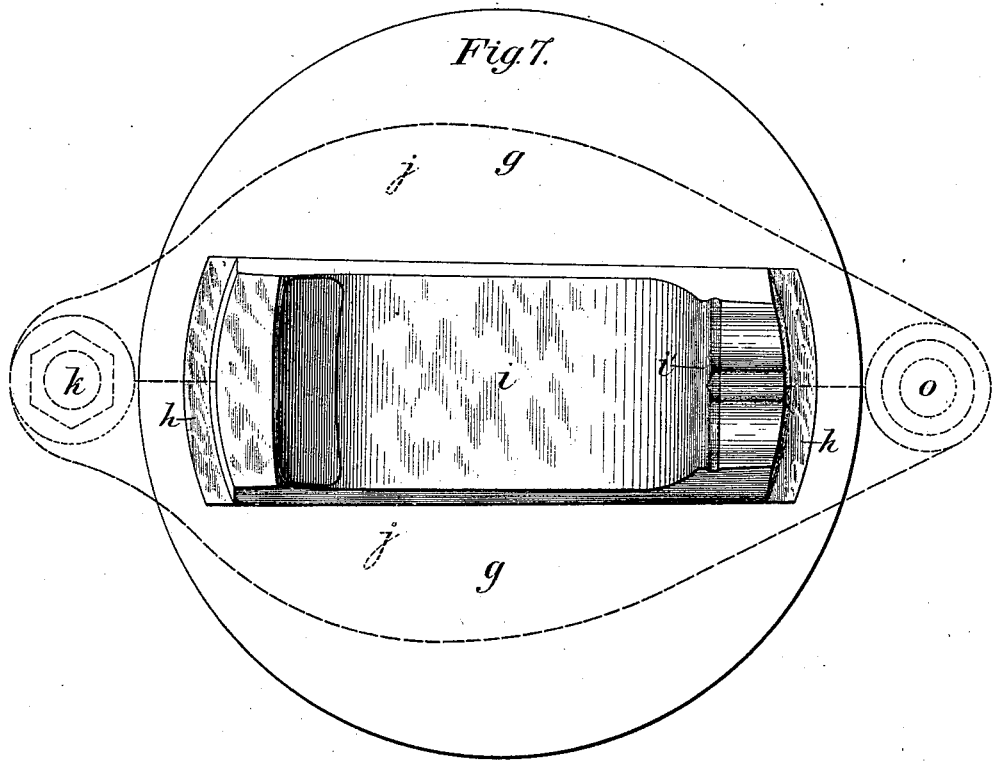
Figure 8:
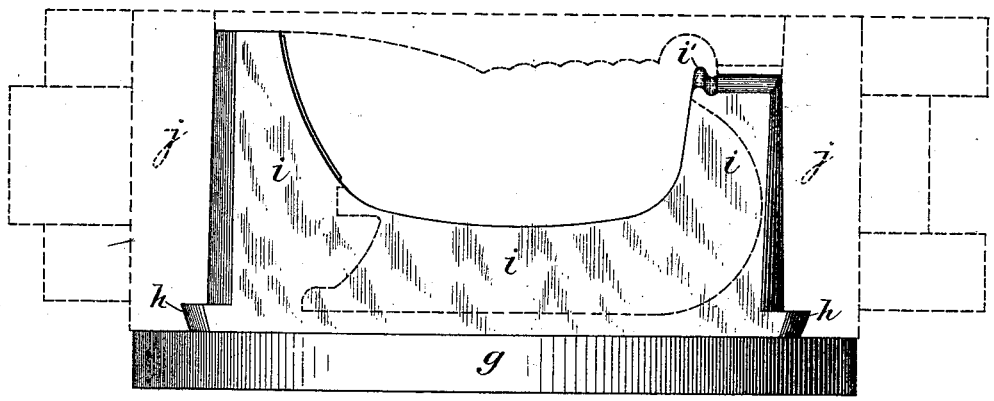
Figure 9:
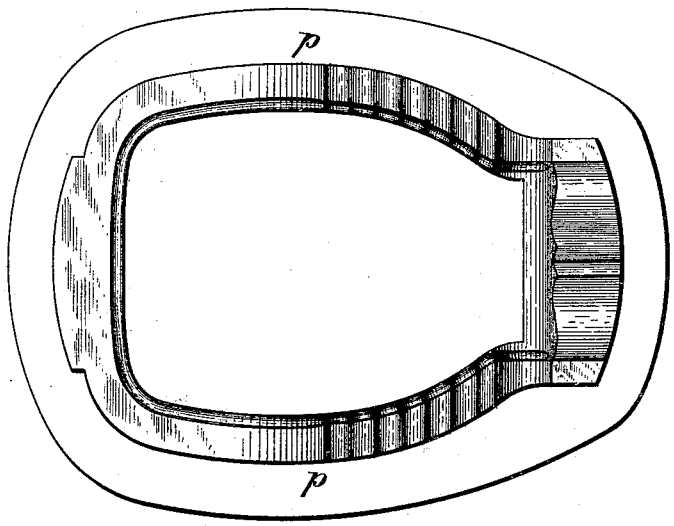
Figure 10:
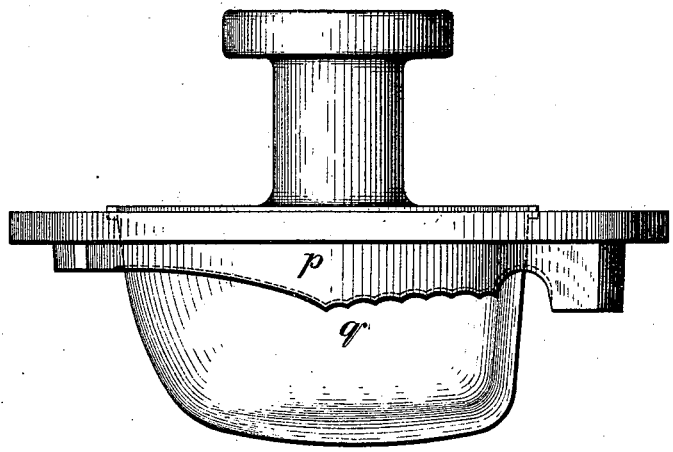

Figure 1 is a side elevation of a glass dish formed in imitation of a sleigh. Fig. 2 is a front elevation of the same. Fig. 3 is a longitudinal section of the mold on the line A A of Fig. 6. Fig. 4 is a cross-section on the line B B of Fig. 6. Fig. 5 is an elevation of one side section of the mold. Fig. 6 is a plan view, one side section of the molds being in place. Fig. 7 is a plan view of the bottom section, the side sections being indicated by dotted lines. Fig. 8 is a side elevation of the bottom section, the side section and molding-cavity being indicated in dotted lines. Fig. 9 is an inverted plan view of the molding-ring. Fig. 10 is a side elevation of the plunger and ring.

Like letters of reference indicate like parts in each.

The particular article for the manufacture of which my improved mold is designed is a glass sleigh, which constitutes an article of table-ware for containing fruit, nuts, flowers, &c., having a body, $a$, runners $b$, knees $c$, and side rails, $d$, and curved dash-board $e$. The runners $b$, knees $c$, and rails $d$ are connected by an intermediate web, $f$, of glass, and the insides of said web are flush with the inner sides of the parts just named, which they connect, so that the article can be removed from the bottom section of the mold. The runners $b$, knees $c$, and rails $d$ project beyond the outer faces of the web, and they are formed by suitable grooves in the hinged side sections of the mold, said side sections drawing away from the article in order to release it from the mold. The mold has a base-plate, $g$, provided with a dovetail, $h$, around which the side sections close in the usual way. Inside of the dovetail is a projection, $i$, which constitutes the bottom of the mold. The side sections, $j$, are hinged together at one end of the mold, as at $k$, and are secured together at the other end by a removable pin, $o$, in the usual manner for securing the open ends of hinged molds. These side sections have flanges $m$, Fig. 4, by which the bottoms of the runners $b$ are formed, and grooves $n$, which form the sides of the runners, knees $c$, and rails $d$. The bottom $i$ is provided with a lip, $i'$, over which the curved edge of the dash-board $e$ is formed. On top of the mold is a mold-ring, $p$, which forms the upper edge of the body $a$ and the curved top of the dash-board $e$, and through which the plunger $q$ operates.

It will be noticed from the foregoing description and the drawings that the sides of the molding-surfaces of the bottom section, $i$, are plain, so that the article may be removed from said bottom section by a vertical movement, while the molding-surfaces which communicate the design or pattern to the side of the article are formed in the hinged portions, which draw directly away therefrom. By this construction of the mold I am enabled to make the glass sleigh shown and described, with its projected running-gear and its curved overhanging dash-board, by molding with all the ease and precision that can be obtained in the manufacture of a plain article.

A particular feature of my invention is the upwardly-projecting bottom section, having smooth sides and constituting a bearing for the mold-ring, so that it not only forms a portion of the inner side of the article, but also one of the outer sides. Ordinarily such projections constitute only the inner side of the molding-cavity, the outer sides being formed by the hinged sections and by the mold-ring. By thus making the projection $i$ of the form to constitute one of the outer molding-surfaces I am enabled to produce the overlapping lip $e'$ of the dash-board, which could not be done if the outer surface of the molding-cavity at that point were formed between the hinged sections. This part of my invention is applicable to the production of other articles having overhanging or other parts incapable of being made by an open-and-shut mold, and as such I claim it broadly. In such case the hinged sections close against that portion of the bottom section which projects up to form the outer side of the molding-cavity, and the ring may, as in the present instance, be partially supported by the same; but this is not absolutely necessary.

What I claim as my invention, and desire to secure by Letters Patent, is—

1. The glass-sleigh mold described, consisting of a bottom section which forms the bottom and two ends of the sleigh-body and the inner sides of the running-gear, with hinged side sections provided with indented patterns for forming the external sides of the sleigh, and a mold-ring which forms the upper edge of the same, substantially as and for the purpose described.

2. A mold for forming a glass sleigh with an overhanging dash-board, having a bottom section which forms the upper side of the sleigh, the inner sides of the running-gear, and the under side of the overhanging dash-board, hinged side sections provided with indented patterns for forming the external sides of the sleigh, which side sections close against one side of the bottom section, and a mold-ring which rests partly on the side sections and partly on the bottom section, substantially as and for the purposes described.

3. An open-and-shut glass-mold having a bottom section which forms the inner side of the bottom molding-cavity and one of the outer sides of the main molding-cavity, substantially as and for the purposes described.

In testimony whereof I have hereunto set my hand this 28th day of January, A. D. 1886.

HENRY FRANZ.

Witnesses:
W. B. CORWIN,
THOMAS B. KERR.